US012807863B2

(12) United States Patent
Al-Taq et al.

(10) Patent No.: US 12,807,863 B2
(45) Date of Patent: Nov. 24, 2026

(54) THERMOCHEMICAL FLUIDS FOR HYDROCARBON OPERATIONS

(71) Applicants: SAUDI ARABIAN OIL COMPANY, Dhahran (SA); KING FAHD UNIVERSITY OF PETROLEUM & MINERALS, Dhahran (SA)

(72) Inventors: Ali Abdullah Al-Taq, Dhahran (SA); Murtada S. Al-Jawad, Dhahran (SA); Abdullah A. Alrustum, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 238 days.

(21) Appl. No.: 18/666,488

(22) Filed: May 16, 2024

(65) Prior Publication Data

US 2025/0354055 A1 Nov. 20, 2025

(51) Int. Cl.
*E21B 36/00* (2006.01)
*C09K 8/536* (2006.01)
(Continued)

(52) U.S. Cl.
CPC .............. *C09K 8/536* (2013.01); *C09K 8/602* (2013.01); *C09K 8/92* (2013.01); *E21B 36/008* (2013.01)

(58) Field of Classification Search
None
See application file for complete search history.

(56) References Cited

U.S. PATENT DOCUMENTS 4,399,868 A * 8/1983 Richardson ............. E21B 36/00 166/303
5,183,581 A 2/1993 Khalil et al.
(Continued)

FOREIGN PATENT DOCUMENTS

CN 109281643 A 1/2019
CN 110938418 A 3/2020
(Continued)

OTHER PUBLICATIONS

PCT International Search Report & Written Opinion pertaining to International Application No. PCT/US2025/027362; Date of Mailing: Jul. 24, 2025.
(Continued)

*Primary Examiner* — Andrew Sue-Ako
(74) *Attorney, Agent, or Firm* — Vorys, Sater, Seymour and Pease LLP

(57) ABSTRACT

Thermochemical fluids may be used for hydrocarbon extraction operations. As an example, methods of using thermochemical fluids may include: providing a first fluid, wherein the first fluid includes a first emulsion of a first aqueous solution and an oleaginous fluid, wherein the first aqueous solution includes a first molar quantity of a first thermoreactive salt, and wherein the first emulsion includes a first emulsifier; and adding a second fluid above the first fluid, wherein the second fluid includes a second aqueous solution of a second molar quantity of a second thermoreactive salt; wherein a second density of the second fluid is greater than a first density of the first fluid, and wherein the first solution and the second solution do not form a second emulsion therebetween.

20 Claims, 3 Drawing Sheets

(51) Int. Cl.
*C09K 8/60* (2006.01)
*C09K 8/92* (2006.01)

(56) References Cited

U.S. PATENT DOCUMENTS

| | | | | |
|---|---|---|---|---|
| 5,639,313 | A | 6/1997 | Khalil | |
| 6,652,867 | B1 | 11/2003 | Vincent et al. | |
| 11,458,419 | B2 | 10/2022 | Almubarak et al. | |
| 2014/0069635 | A1* | 3/2014 | Cordiner | C09K 8/36 166/246 |
| 2014/0144632 | A1 | 5/2014 | Sosnin et al. | |
| 2023/0374385 | A1 | 11/2023 | Saheed et al. | |

FOREIGN PATENT DOCUMENTS

| | | | |
|---|---|---|---|
| CN | 111333473 | A | 6/2020 |
| CN | 113512412 | A | 10/2021 |
| RU | 2146725 | C1 | 3/2000 |
| RU | 2721200 | C1 | 5/2020 |

OTHER PUBLICATIONS

Nguyen et al., "Kinetics and mechanism of the reaction between ammonium and nitrite ions: experimental and theoretical studies," Chemical Engineering Science 58 (2003) 4351-4362.

* cited by examiner

THERMOCHEMICAL FLUIDS FOR HYDROCARBON OPERATIONS

FIELD OF THE DISCLOSURE

The present disclosure relates generally to hydrocarbon extraction and, more particularly, to use of fluids in treatment for hydrocarbon operations.

BACKGROUND OF THE DISCLOSURE

Thermochemical fluids are fluids that include components that react in a fashion so as to generate or absorb significant thermal energy. Thermochemical fluids may include compounds capable of reacting in an exothermic manner so as to heat surroundings. Thermochemical fluids may generally be useful in a variety of hydrocarbon operations including as treatment fluids for enhanced hydrocarbon recovery. For example, thermochemical fluids may be used to impart heat to a subterranean formation so as to promote mobilization of hydrocarbons.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting example method of the present disclosure may include: providing a first fluid, wherein the first fluid comprises a first emulsion of a first aqueous solution and an oleaginous fluid, wherein the first aqueous solution comprises a first molar quantity of a first thermoreactive salt, and wherein the first emulsion includes a first emulsifier; and adding a second fluid above the first fluid, wherein the second fluid comprises a second aqueous solution of a second molar quantity of a second thermoreactive salt; wherein a second density of the second fluid is greater than a first density of the first fluid, and wherein the first solution and the second solution do not form a second emulsion therebetween.

A second nonlimiting example method of the present disclosure may include: introducing a first fluid to a region of interest, wherein the first fluid comprises a first emulsion of a first aqueous solution and an oleaginous fluid, wherein the first aqueous solution comprises a first molar quantity of a first thermoreactive salt, and wherein the first emulsion includes a first emulsifier; and introducing a second fluid above the region of interest, wherein the second fluid comprises a second aqueous solution of a second molar quantity of a second thermoreactive salt, wherein a second density of the second fluid is greater than a first density of the first fluid, and wherein the first solution and the second solution do not form a second emulsion therebetween.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
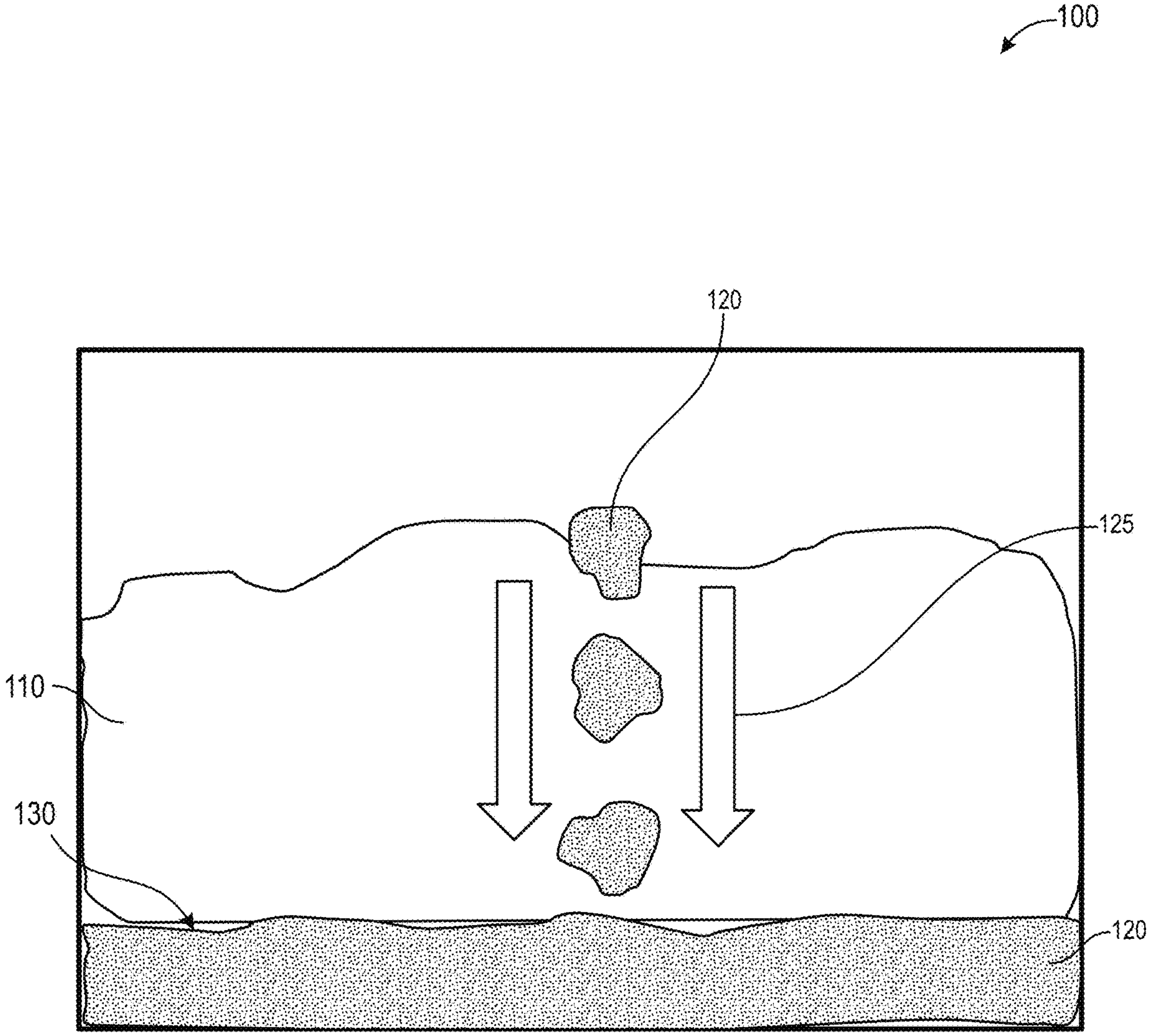
FIG. 1 is a diagram of a nonlimiting example system according to the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate hydrocarbon extraction and, more particularly, to use of fluids in treatment for hydrocarbon operations.

Methods of the present disclosure allow for optimized use of thermochemical fluids including thermoreactive salts therein within the same environment. Such thermochemical fluids may conventionally react prematurely, leading to lower effectiveness and limitations of use.

Methods of the present disclosure include providing a first fluid including a first thermoreactive salt and subsequently adding a second fluid including a second thermoreactive salt, whereby the first fluid and the second fluid do not emulsify or otherwise substantially mix, allowing the first thermoreactive salt and the second thermoreactive salt to remain separated until needed for use. The first thermoreactive salt may be introduced as an emulsion of a first aqueous solution and an oleaginous fluid, wherein the first aqueous solution comprises a first molar quantity of a first thermoreactive salt, and wherein the first emulsion is facilitated through the use of an emulsifier. Subsequently a second fluid including a second thermoreactive salt may be added to the first fluid. The second fluid may include a second aqueous solution comprising a second molar quantity of a second thermoreactive salt.

A diagram illustrating a nonlimiting example embodiment of the present disclosure is shown in FIG. 1. System 100 includes wherein a first fluid 110 is provided and a second fluid 120 is added thereto. The second fluid 120 drops below the first fluid 110 as indicated by arrows 125. The first fluid 110 and the second fluid 120 form an interface 130 whereby the first fluid and the second fluid do not substantially mix and do not form an emulsion therebetween.

The second fluid may be added to the first fluid in any suitable manner including, but not limited to, for example, dropwise, continuously, batch-wise, the like, or any combination thereof. The first and second fluid may be introduced to a region of interest in any suitable application including, for example, as treatment fluids within a region of interest in a subterranean formation, or for dewaxing or other cleaning operations of a zone of interest in a hydrocarbon pipeline.

Greater than 80 vol % (or greater than 70 vol %, or greater than 90 vol %, or from 70 vol % to 100 vol %, or 80 vol % to 100 vol %, or 90 vol % to 100 vol %, or 70 vol % to 99.99 vol %, or 80 vol % to 99.99 vol %, or 90 vol % to 99.99 vol %) of the second fluid may sink below the first fluid. "Sink below," "below," and grammatically related terms as used herein refer to wherein a fluid is generally at a lower elevation than the reference fluid, including if the fluid is immediately beneath the reference fluid and if the fluid is not immediately beneath the reference fluid, or any combination thereof. For example, within a subterranean formation, a second fluid may be below a first fluid if the second fluid is in an adjacent space at least partially at lower elevation than the first fluid within the subterranean formation wherein the adjacent space is not immediately beneath the location of the first fluid.

Methods of the present disclosure may be such as to allow the first fluid and the second fluid to not form an emulsion (e.g., a second emulsion) therebetween, or otherwise mix substantially. "Not substantially mix," and grammatical variations thereof, as used herein, refers to whereby two fluids do not visually combine and retain respective fluid bodies in a separated manner.

The first fluid may include one or more first thermoreactive salts that would be capable of undergoing an exothermic reaction once contacted with one or more suitable second salts under conditions at which the exothermic reaction may occur. The first and second thermoreactive salts may, in some embodiments, be selected such that the second fluid has a greater density than the first fluid, allowing the second fluid to sink below the first fluid. In non-limiting examples, the first and second thermoreactive salts may each comprise an ammonium cation or a nitrite anion, in any combination. In some examples, the first thermoreactive salt may comprise a nitrite anion and the second thermoreactive salt may comprise an ammonium cation, wherein the nitrite anion and the ammonium cation may undergo an exothermic reaction when exposed to suitable conditions. In other examples, the first thermoreactive salt may comprise an ammonium cation and the second thermoreactive salt may comprise a nitrite anion, wherein the nitrite anion and the ammonium cation may undergo an exothermic reaction when exposed to suitable conditions. In more specific examples, the first and second thermoreactive salts may comprise an ammonium halide, such as ammonium chloride, and an alkali metal nitrite, such as sodium nitrite. Accordingly, in some examples, the first thermoreactive salt may comprise a nitrite anion, such as sodium nitrite or other alkali metal nitrite, and the second thermoreactive salt may comprise an ammonium cation, such as an ammonium halide (e.g., ammonium chloride), ammonium nitrate, or ammonium sulfate. In other examples, the first thermoreactive salt may comprise an ammonium cation, such as an ammonium halide (e.g., ammonium chloride), ammonium nitrate, or ammonium sulfate, and the second thermoreactive salt may comprise a nitrite anion, such as sodium nitrite or other alkali metal nitrite. Process configurations in which the first thermoreactive salt comprises an ammonium cation may be particularly advantageous for use in the present disclosure. It should be noted that the present disclosure may include whereby any suitable thermoreactive salts are used in the first fluid and the second fluid.

The term "exothermic" and grammatical variants thereof, as used herein, refer to a chemical reaction that generates thermal energy (e.g., heat) and may be defined as a reaction having an enthalpy of reaction (ΔH) less than zero. A nonlimiting exothermic reaction of sodium nitrite and ammonium chloride is shown in Reaction 1 below:

Reaction 1

$$NaNO_2 + NH_4Cl \longrightarrow NaCl + H_2O + N_2$$

In the case of the exothermic reaction between sodium nitrite and ammonium chloride, the enthalpy of reaction is $-79.95$ kcal $mol^{-1}$. The temperature increase resulting from an exothermic reaction may be sufficient to facilitate various reactions, including, for example, an exothermic reaction occurring in a subterranean formation. Such reactions may include, for example, breaking of a gel, dewaxing, reaction with a geological material in a subterranean formation, the like, or any combination thereof.

A further nonlimiting exothermic reaction in accordance with the present disclosure may additionally include whereby the first thermoreactive salt comprises sodium nitrite and the second thermoreactive salt comprises ammonium sulfate, as shown in Reaction 2.

Reaction 2

$$2NaNO_2 + (NH_4)_2SO_4 \xrightarrow{H+} 2N_2 + 4H_2O + Na_2SO_4$$

A further nonlimiting exothermic reaction in accordance with the present disclosure may additionally include whereby the first thermoreactive salt comprises sodium nitrite and the second thermoreactive salt comprises ammonium nitrate, as shown in Reaction 3.

Reaction 3

$$NaNO_2 + NH_4NO_3 \longrightarrow N_2 + 2H_2O + NaNO_3$$

The first fluid and the second fluid each have a thermoreactive salt concentration sufficient to generate or absorb an effective amount of thermal energy for an intended reaction within an operation. For example, thermoreactive salt concentrations for the first fluid and the second fluid may independently range from about 1 M (mol/L) to about 7 M, or about 3 M to about 6 M, or about 4 M to about 6 M, or about 3 M to about 5 M, or about 2 M to about 7 M. The thermoreactive salt concentration of the first fluid and the second fluid may be the same or may differ. The molar quantities of the first thermoreactive salt and the second thermoreactive salt may preferably be equimolar such that a first molar quantity of the first thermoreactive salt and a second molar quantity of the second thermoreactive salt are such that the second molar quantity may be from about 10% less than the first molar quantity to about 10% greater than the first molar quantity (or from 25% less than the first molar quantity to 25% greater than the first molar quantity).

The volume of the first fluid and the second fluid introduced to the subterranean formation may be the same or differ, preferably being the same. In some embodiments, the volume of the second fluid may be from about 10% less than the volume of the first fluid to about 10% greater than the volume of the first fluid (or from 25% less than the volume of the first fluid to 25% greater than the volume of the first fluid). By varying the thermoreactive salt concentrations, the amounts of the first and second thermoreactive salts, and amounts of the first and second fluids, the optimized reactivity of the first and second fluid may be obtained and subsequent heat released in an exothermic reaction may be varied based on application-specific needs.

Oleaginous fluids of use in emulsions described herein may include any suitable oleaginous fluid capable of forming a water-in-oil emulsion with an aqueous fluid. Oleaginous fluids of use in the present disclosure may include a hydrocarbon. Examples of suitable hydrocarbons may include, but are not limited to, for example, diesel, gasoline, crude oil, the like, or any combination thereof. Oleaginous fluids of the present disclosure may be included in the first fluid at a concentration of about 20 vol % to about 99.99 vol %, or about 70 vol % to about 90 vol %, or about 20 vol % to about 90 vol %, or about 20 vol % to about 70 vol %, or about 20 vol % to about 60 vol %, or about 20 vol % to about 50 vol %, or about 30 vol % to about 50 vol %, or about 20 vol % to about 40 vol %, or about 25 vol % to about 35 vol %, or about 30 vol %, based on a total volume of the first fluid.

Emulsifiers may be included in the first fluid of the present disclosure as described herein. Suitable emulsifiers may include any suitable surfactant compound(s) capable of facilitating a water-in-oil emulsion within the first fluid. Examples of suitable emulsifiers may include, but are not limited to, an ethoxylated p-nonyl-phenol, a soap of a fatty acid amine, a carboxylic acid terminated fatty polyamide, a tall oil fatty acid, a glycol, a phosphate ester, an ethanolamine, a polyolefin amide alkene amine, an amidoamine, an amine coco-alkyl acetate, ethylene glycol, an acetic acid, the like, or any combination thereof. Preferred emulsifiers may include, but are not limited to, Emulsifier-S289, Emulsifier-U108, Emulsifier-AF-70 (all available from OliServ), or a combination thereof. The emulsifier may be included in the first fluid at a concentration of about 1 vol % to about 10 vol % (or about 1 vol % to about 5 vol %, or about 2 vol % to about 8 vol %, or about 3 vol % to about 7 vol %, or about 1 vol % to about 3 vol %, or about 3 vol % to about 10 vol %, or 1 vol % to 10 vol %, or 1 vol % to 5 vol %, or 2 vol % to 8 vol %, or 3 vol % to 7 vol %, or 1 vol % to 3 vol %, or 3 vol % to 10 vol %) based on the total volume of the first fluid.

Fluids of the present disclosure may further include one or more additional components suitable for achieving one or more desired functions (e.g., in addition to thermoreactive or other functions described herein). Examples of suitable additional components may include, but are not limited to, a salt, a weighting agent, an inert solid, a fluid loss control agent, an additional emulsifier, a dispersion aid, a corrosion inhibitor, an emulsion thinner, an emulsion thickener, a viscosifying agent, a gelling agent, a particulate, a lost circulation material, a foaming agent, a gas, a pH control additive, a breaker, a biocide, a crosslinker, a chelating agent, a scale inhibitor, a gas hydrate inhibitor, a mutual solvent, an oxidizer, a reducer, a friction reducer, an iron control agent, the like, or any combination thereof. Suitable examples of the foregoing will be familiar to one having ordinary skill in the art.

The fluids described herein may be used in any suitable operation including within treatment fluids for hydrocarbon extraction operations. Any of the fluids discussed herein may be mixed at a remote location from a job site and shipped thereto or may be mixed at a job site. In still other examples, mixing of the fluid(s) may take place on-the-fly as the fluid is pumped into a subterranean formation. A person having ordinary skill in the art and the benefit of this disclosure will be able to consider these factors and determine whether remote mixing, on-site mixing, or any other suitable mixing protocol is most appropriate for a given operation.

Systems for introducing the fluids of the present disclosure into a region of interest for a given operation may include one or more mixing and/or storage tanks for mixing and/or storing the fluids prior to their introduction to the region of interest (e.g., a subterranean formation). Additional tanks may be used for storing spent or partially spent fluids removed from a region of interest as part of a cleanup operation.

Systems for introducing the fluids to a region of interest (e.g., a subterranean formation) in conjunction with an operation may comprise a pump fluidly coupled to a tubing extended into a portion of the region of interest (e.g., a wellbore penetrating the subterranean formation). The pump may comprise a single pump or may comprise multiple pumps, which may include high-pressure or low-pressure pumps in any combination. Given the benefit of the present disclosure, one having ordinary skill in the art will be able to select an appropriate pump or combination of pumps for a given application.

The fluids of the present disclosure may be introduced into the region of interest using the pump(s) and tubing located therein. After operations have occurred, the fluids and residual components (e.g., spent thermoreactive salts) may be produced from the region of interest by flowing through the tubing or through an annulus defined (e.g., a space between a tubing and the walls of a wellbore).

Additional non-limiting components may be present in systems suitable to introduce and retrieve fluids according to the present disclosure and will be familiar to persons having ordinary skill in the art. Such components may include, for example, supply hoppers, valves, condensers, adapters, joints, gauges, sensors, compressors, pressure controllers, pressure sensors, flow rate controllers, flow rate sensors, temperature sensors, the like, or any combination thereof.

Embodiments disclosed herein include:

Embodiment 1. A method comprising: providing a first fluid, wherein the first fluid comprises a first emulsion of a first aqueous solution and an oleaginous fluid, wherein the first aqueous solution comprises a first molar quantity of a first thermoreactive salt, and wherein the first emulsion includes a first emulsifier; and adding a second fluid above the first fluid, wherein the second fluid comprises a second aqueous solution of a second molar quantity of a second thermoreactive salt; wherein a second density of the second fluid is greater than a first density of the first fluid, and wherein the first solution and the second solution do not form a second emulsion therebetween.

Embodiment 2. The method of Embodiment 1, wherein 80 vol % of the second solution sinks below the first solution.

Embodiment 3. The method of Embodiment 1 or 2, wherein adding the second aqueous solution above the first solution does not initiate a substantial reaction between the first thermoreactive salt and the second thermoreactive salt.

Embodiment 4. The method of any one of Embodiments 1-3, wherein the first thermoreactive salt and the second thermoreactive salt are capable of undergoing an exothermic reaction.

Embodiment 5. The method of any one of Embodiments 1-4, wherein the first emulsion and the second aqueous solution are at temperature and pressure conditions whereby the first thermoreactive salt and the second thermoreactive salt are capable of undergoing an exothermic reaction.

Embodiment 6. The method of any one of Embodiments 1-5, wherein the oleaginous fluid comprises a hydrocarbon.

Embodiment 7. The method of Embodiment 6, wherein the hydrocarbon comprises diesel, gasoline, crude oil, or any combination thereof.

Embodiment 8. The method of any one of Embodiments 1-7, wherein the emulsifier comprises an ethoxylated p-nonyl-phenol, a soap of a fatty acid amine, a carboxylic acid terminated fatty polyamide, a tall oil fatty acid, a glycol, a phosphate ester, an ethanolamine, a polyolefin amide alkene amine, an amidoamine, an amine coco-alkyl acetate, ethylene glycol, an acetic acid, or any combination thereof.

Embodiment 9. The method of any one of Embodiments 1-8, wherein the second molar quantity is from about 10% less than the first molar quantity to about 10% greater than the first molar quantity.

Embodiment 10. The method of any one of Embodiments 1-9, wherein the first thermoreactive salt comprises a nitrite anion and the second thermoreactive salt comprises an ammonium cation.

Embodiment 11. The method of any one of Embodiments 1-10, wherein the first thermoreactive salt comprises an alkali metal nitrite and the second thermoreactive salt comprises an ammonium halide.

Embodiment 12. The method of any one of Embodiments 1-11, wherein the first thermoreactive salt comprises sodium nitrite and the second thermoreactive salt comprises ammonium chloride.

Embodiment 13. The method of any one of Embodiments 1-9, wherein the first thermoreactive salt comprises an ammonium cation and the second thermoreactive salt comprises a nitrite anion.

Embodiment 14. The method of any one of Embodiments 1-8 or 12, wherein the first thermoreactive salt comprises an ammonium halide and the second thermoreactive salt comprises an alkali metal nitrite.

Embodiment 15. The method of any one of Embodiments 1-8 or 12-13, wherein the first thermoreactive salt comprises ammonium chloride and the second thermoreactive salt comprises sodium nitrite.

Embodiment 16. A method comprising: introducing a first fluid to a region of interest, wherein the first fluid comprises a first emulsion of a first aqueous solution and an oleaginous fluid, wherein the first aqueous solution comprises a first molar quantity of a first thermoreactive salt, and wherein the first emulsion includes a first emulsifier; and introducing a second fluid above the region of interest, wherein the second fluid comprises a second aqueous solution of a second molar quantity of a second thermoreactive salt, wherein a second density of the second fluid is greater than a first density of the first fluid, and wherein the first solution and the second solution do not form a second emulsion therebetween.

Embodiment 17. The method of Embodiment 16, wherein the region of interest is located within a subterranean formation.

Embodiment 18. The method of Embodiment 16 or 17, wherein the region of interest is located within a pipeline.

Embodiment 19. The method of any one of Embodiments 16-18, wherein the second molar quantity is from about 10% less than the first molar quantity to about 10% greater than the first molar quantity.

Embodiment 20. The method of any one of Embodiments 16-19, wherein the first thermoreactive salt comprises a nitrite anion and the second thermoreactive salt comprises an ammonium cation.

EXAMPLES

Experiment 1. Autoclave Reactivity Testing

Experimental Example A1 and Comparative Examples CE1-CE4 was formed including 5M $NH_4Cl$ and 5M $NaNO_2$. In Example A1, 5M $NH_4Cl$ was emulsified in 70 vol % water and 25 vol % diesel, using 5 vol % emulsifier. Example A1 used Emuslfier-S289. Subsequently upon testing, a volume of 5M $NaNO_2$ in water, equal to the volume of the $NH_4Cl$ emulsion was added thereto. Comparative Examples CE1-CE4 were formed by individually emulsifying 5M $NH_4Cl$ and 5M $NaNO_2$ in 70 vol % water and 25 vol % diesel, using 5 vol % emulsifier, to form equal volumes. Subsequently the emulsions of $NH_4Cl$ and $NaNO_2$ were combined together upon testing to form each of the Examples CE1-CE4. For CE1, each individual emulsion used Emulsifier-U108. For CE2, each individual emulsion used Emulsifier-AF-70. For CE3, the individual $NH_4Cl$ emulsion used Emuslfier-U108 and the individual $NaNO_2$ emulsion used Emuslfier-S289. For CE2, each individual emulsion used Emuslfier-S289. All emulsifiers used in Experimental Samples and Comparative Examples are available from OilServ.

Individual emulsions in Comparative Examples CE1-CE4 and the 5M $NH_4Cl$ emulsion of Experimental Example A1 were prepared by first dissolving the requisite emulsifier in the diesel, agitating the mixture at about 3,000 rpm for 2 min. For Comparative Examples CE1-CE4, the $NH_4Cl$ and $NaNO_2$ solutions were formed separately, subsequently gradually added to diesel-emulsified mixture, and the solutions were allowed to mix at a high speed of 10,000 rpm for 10 minutes to ensure the formation of emulsion. For Experimental Example A1 the 5M $NaNO_2$ was added and mixed in an equivalent fashion. A high shear rate Silverson-L5M-A model mixer was used.

Figure 2:
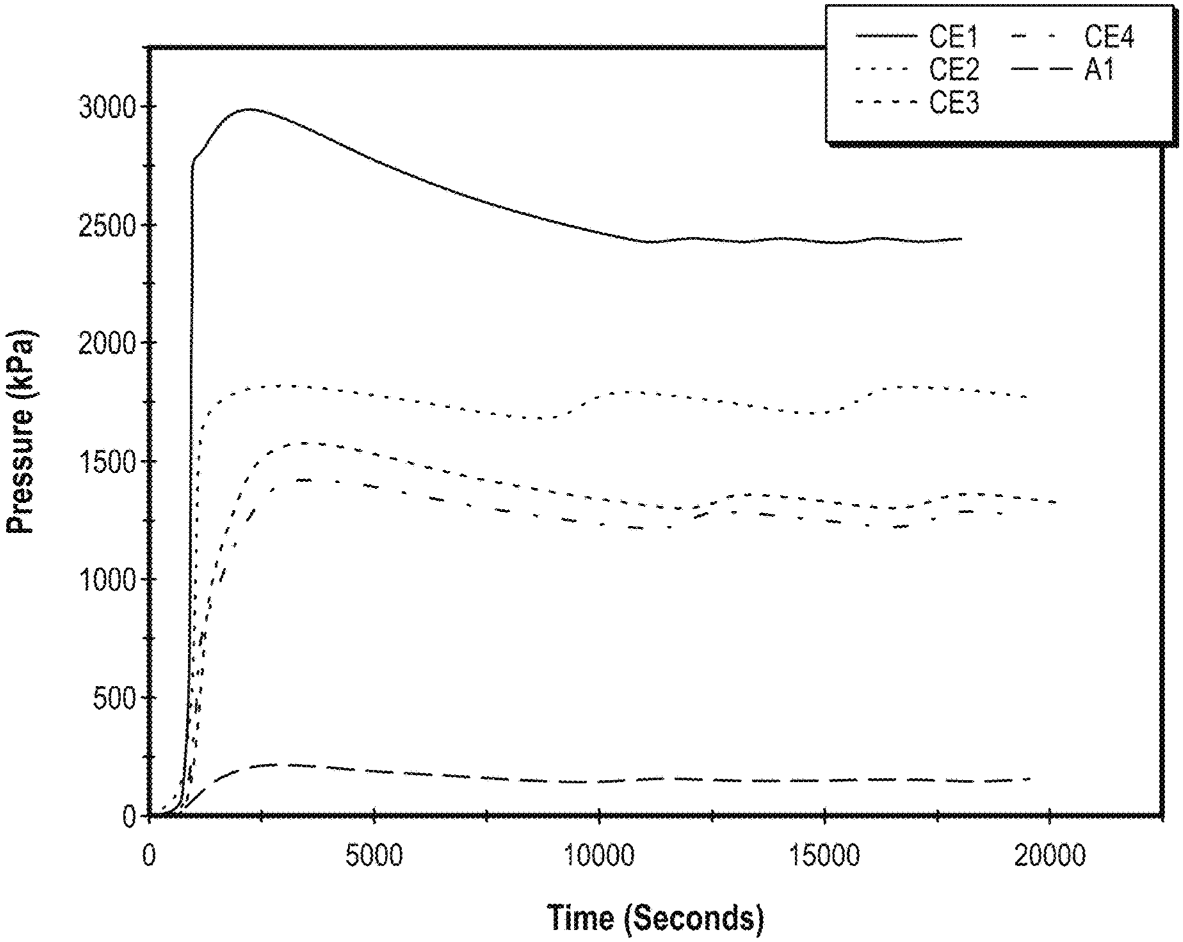
FIG. 2 is a graph of examples tested according to the present disclosure.

Pressure testing was conducted using an OLT-HP-500 autoclave at pressures up to about 3000 kPa over a period of up to about 5.5 hours. Pressure was tracked over time as shown in FIG. 2. Higher pressures resulted from greater reactivity of $NH_4Cl$ and $NaNO_2$.

Figure 3:
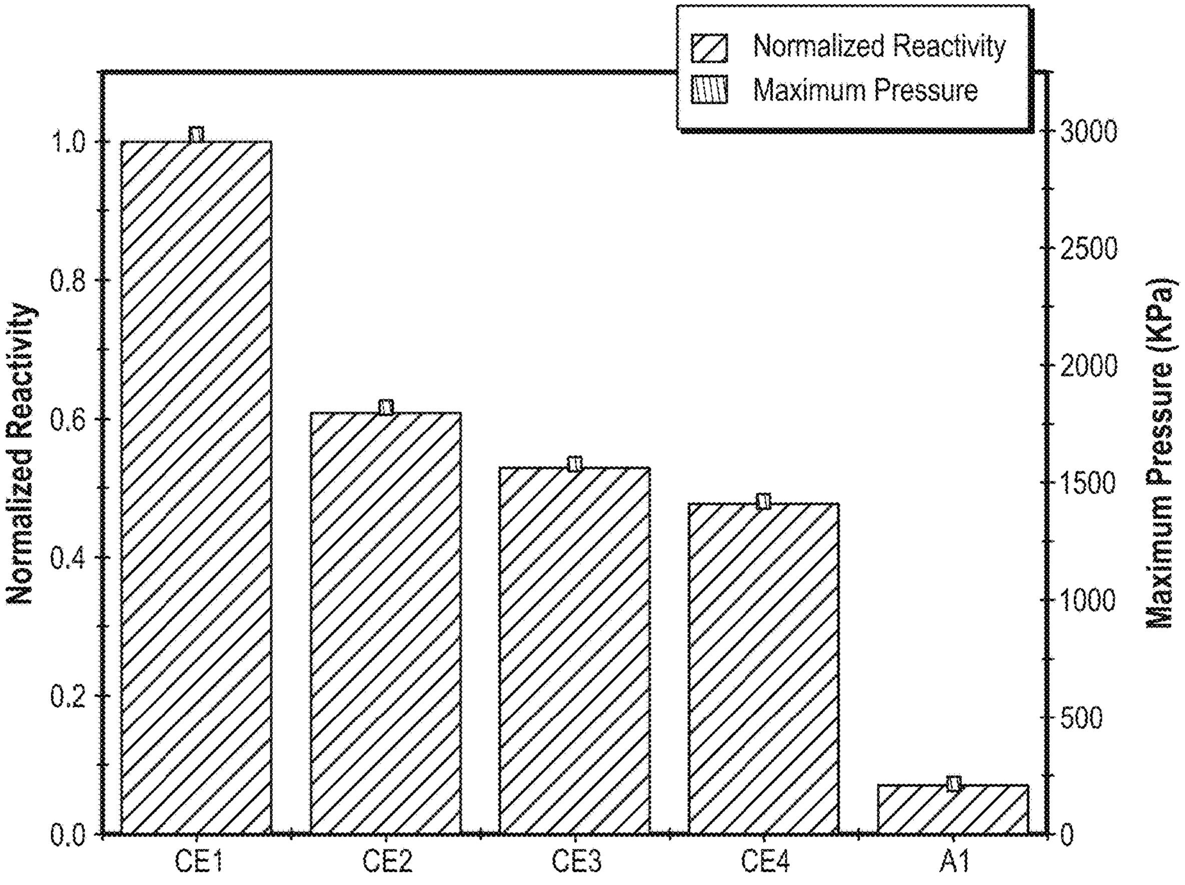
FIG. 3 is a graph of examples tested according to the present disclosure.

Furthermore normalized reactivity and maximum pressure was derived from all samples, as shown in FIG. 3. As shown, Sample A1 had significantly lower reactivity between the $NH_4Cl$ and $NaNO_2$ as compared to Comparative Examples CE1-CE4.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What claimed is:

1. A method comprising:

providing a first fluid, wherein the first fluid comprises a first emulsion of a first aqueous solution and an oleaginous fluid, wherein the first aqueous solution comprises a first molar quantity of a first thermoreactive salt, and wherein the first emulsion includes a first emulsifier; and adding a second fluid above the first fluid, wherein the second fluid comprises a second aqueous solution of a second molar quantity of a second thermoreactive salt;

wherein the first thermoreactive salt and the second thermoreactive salt each comprise one or more compounds selected from the group consisting of an ammonium cation, a nitrite anion, or a combination thereof; and wherein a second density of the second fluid is greater than a first density of the first fluid, and wherein the first fluid and the second fluid do not form a second emulsion therebetween.

2. The method of claim 1, wherein 80 vol % of the second fluid sinks below the first fluid.

3. The method of claim 1, wherein adding the second fluid above the first fluid does not initiate a substantial reaction between the first thermoreactive salt and the second thermoreactive salt.

4. The method of claim 1, wherein the first thermoreactive salt and the second thermoreactive salt are capable of undergoing an exothermic reaction.

5. The method of claim 1, wherein the first emulsion and the second fluid are at temperature and pressure conditions whereby the first thermoreactive salt and the second thermoreactive salt are capable of undergoing an exothermic reaction.

6. The method of claim 1, wherein the oleaginous fluid comprises a hydrocarbon.

7. The method of claim 6, wherein the hydrocarbon comprises diesel, gasoline, crude oil, or any combination thereof.

8. The method of claim 1, wherein the emulsifier comprises an ethoxylated p-nonyl-phenol, a soap of a fatty acid amine, a carboxylic acid terminated fatty polyamide, a tall oil fatty acid, a glycol, a phosphate ester, an ethanolamine, a polyolefin amide alkene amine, an amidoamine, an amine coco-alkyl acetate, ethylene glycol, an acetic acid, or any combination thereof.

9. The method of claim 1, wherein the second molar quantity is from about 10% less than the first molar quantity to about 10% greater than the first molar quantity.

10. The method of claim 1, wherein the first thermoreactive salt comprises a nitrite anion and the second thermoreactive salt comprises an ammonium cation.

11. The method of claim 1, wherein the first thermoreactive salt comprises an alkali metal nitrite and the second thermoreactive salt comprises an ammonium halide.

12. The method of claim 1, wherein the first thermoreactive salt comprises sodium nitrite and the second thermoreactive salt comprises ammonium chloride.

13. The method of claim 1, wherein the first thermoreactive salt comprises an ammonium cation and the second thermoreactive salt comprises a nitrite anion.

14. The method of claim 1, wherein the first thermoreactive salt comprises an ammonium halide and the second thermoreactive salt comprises an alkali metal nitrite.

15. The method of claim 1, wherein the first thermoreactive salt comprises ammonium chloride and the second thermoreactive salt comprises sodium nitrite.

16. A method comprising:

introducing a first fluid to a region of interest, wherein the first fluid comprises a first emulsion of a first aqueous solution and an oleaginous fluid, wherein the first aqueous solution comprises a first molar quantity of a first thermoreactive salt, and wherein the first emulsion includes a first emulsifier; and introducing a second fluid above the region of interest, wherein the second fluid comprises a second aqueous solution of a second molar quantity of a second thermoreactive salt, wherein the first thermoreactive salt and the second thermoreactive salt each comprise one or more compounds selected from the group consisting of an ammonium cation, a nitrite anion, or a combination thereof; and wherein a second density of the second fluid is greater than a first density of the first fluid, and wherein the first fluid and the second fluid do not form a second emulsion therebetween.

17. The method of claim 16, wherein the region of interest is located within a subterranean formation.

18. The method of claim 16, wherein the region of interest is located within a pipeline.

19. The method of claim 16, wherein the second molar quantity is from about 10% less than the first molar quantity to about 10% greater than the first molar quantity.

20. The method of claim 16, wherein the first thermoreactive salt comprises a nitrite anion and the second thermoreactive salt comprises an ammonium cation.

* * * * *